(12) United States Patent
Kim

(10) Patent No.: US 7,950,009 B2
(45) Date of Patent: May 24, 2011

(54) TERMINAL AND METHOD OF DISPLAYING CONTENT THEREOF

(75) Inventor: Jong Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 749 days.

(21) Appl. No.: 11/954,179

(22) Filed: Dec. 11, 2007

(65) Prior Publication Data

US 2008/0178104 A1 Jul. 24, 2008

(30) Foreign Application Priority Data

Jan. 19, 2007 (KR) .................. 10-2007-0006198

(51) Int. Cl.
*G06F 9/445* (2006.01)
*G09G 5/00* (2006.01)

(52) U.S. Cl. ........ 717/174; 715/848; 715/849; 715/850; 717/107; 717/141; 709/205; 707/831; 345/111

(58) Field of Classification Search .......... 715/200–277, 715/700–867; 700/701–866; 709/201–229; 705/50–79; 345/30–111; 348/206–231.9; 707/831; 717/107, 141, 174
See application file for complete search history.

(56) References Cited

U.S. PATENT DOCUMENTS

| | | | | |
|---|---|---|---|---|
| 6,522,347 | B1 * | 2/2003 | Tsuji et al. ................ | 715/848 |
| 7,769,794 | B2 * | 8/2010 | Moore et al. ............... | 707/831 |
| 2003/0028864 | A1 * | 2/2003 | Bowen ..................... | 717/141 |
| 2003/0033588 | A1 * | 2/2003 | Alexander ................ | 717/107 |
| 2006/0020904 | A1 * | 1/2006 | Aaltonen et al. ........... | 715/850 |
| 2006/0206890 | A1 * | 9/2006 | Shenfield et al. .......... | 717/174 |
| 2006/0248115 | A1 | 11/2006 | Schmidt et al. | |
| 2007/0282951 | A1 * | 12/2007 | Selimis et al. ............ | 709/205 |
| 2008/0102894 | A1 * | 5/2008 | Ban et al. ................. | 455/558 |
| 2008/0172628 | A1 * | 7/2008 | Mehrotra et al. .......... | 715/771 |

FOREIGN PATENT DOCUMENTS

| | | |
|---|---|---|
| DE | 103 19 588 A1 | 3/2005 |
| DE | 11 2005 003 157 T5 | 12/2007 |
| KR | 10-2006-0015244 A | 2/2006 |
| WO | WO-2006/065816 A1 | 6/2006 |

* cited by examiner

*Primary Examiner* — Ruay L Ho

(74) *Attorney, Agent, or Firm* — Birch, Stewart, Kolasch & Birch, LLP

(57) ABSTRACT

A method of displaying contents on a mobile terminal. The method includes displaying a plurality of contents on a display of the mobile terminal, selecting a content from the plurality of displayed contents, and displaying the selected content and similar contents having a similar type as the selected content to be discriminated from other displayed contents that do not have the similar type as the selected content.

19 Claims, 10 Drawing Sheets

FIG. 3

| Content type | Executable file extension | Display color |
|---|---|---|
| Still picture | jpg, gif, sis | Red |
| Moving picture | skm, k3g, mp4, avi | Orange |
| Music | mp3, dcf, kmp, kcp, kpp, ncd | Yellow |
| Sound | mmf, gcp | Green |
| Document | hwp, doc, ppt, xls, pdf, txt | Blue |
| Flash | swf | Indigo blue |
| Other | Other extensions | Purple |

1,4,7 : Red
2,6 : Orange
3 : Yellow
5 : Blue 1,4,7 : Red
2,6 : Orange
3 : Yellow
5 : Blue 1,4,7 : Red
2,6 : Orange
3 : Yellow
5 : Blue 1,4,7 : Red
2,6 : Orange
3 : Yellow
5 : Blue 1,2,3 : Red
4,5 : Orange
6 : Yellow
7 : Blue 1,2 : Orange
3 : Yellow
4 : Blue
5,6,7 : Red

TERMINAL AND METHOD OF DISPLAYING CONTENT THEREOF

The present application claims priority to Korean Patent Application No. P.10-2007-0006198, filed on Jan. 19, 2007, which is hereby incorporated by reference as if fully set forth herein.

BACKGROUND OF THE INVENTION

1. Field of the Invention

The present invention relates to a mobile terminal and corresponding method that discriminately displays contents having a similar type from contents that do not have the similar type.

2. Discussion of the Related Art

Mobile terminals now provide many additional functions besides the basic calling function. For example, user can now access the Internet, play games, watch videos or other broadcasts, send and receive text and voice messages, etc. using their mobile terminal. Further, as the number of functions provided on the mobile terminal has increased, so has the amount of information displayed on the terminal.

In addition, mobile terminals include directional keys that the user may press to move a cursor from one selected item to another. Thus, when the terminal displays a plurality of contents in a list, the user can press a directional key to navigate between the items in the list.

For example, if the user of the terminal selects one of the contents, the terminal highlights the selected content or places a cursor on the selected content. Then, the user can move the cursor from the currently selected content to another content using the direction key(s) provided on the terminal. For instance, when the user wants to move from a first content at a second row to a second content at a sixth row, the user manipulates the downward direction key four times to select the second content.

Therefore, the user has to manipulate the direction keys many times to move between the different contents displayed on the terminal. This is inconvenient and time consuming for the user.

SUMMARY OF THE INVENTION

Accordingly, one object of the present invention is to address the above-noted and other problems.

Another object of the present invention is to provide a mobile terminal and corresponding method that allows a user to quickly traverse and view contents that have a similar type.

Yet another object of the present invention is to discriminately display contents that have a similar type from contents that do not have the similar type.

To achieve these and other advantages and in accordance with the purpose of the present invention, as embodied and broadly described herein, the present invention provides in one aspect a method of displaying contents on a mobile terminal. The method includes displaying a plurality of contents on a display of the mobile terminal, selecting a content from the plurality of displayed contents, and discriminately displaying the selected content and similar contents having a similar type as the selected content from other displayed contents that do not have the similar type as the selected content.

In another aspect, the present invention provides a mobile terminal including a display unit configured to display a plurality of contents, an input unit configured to select a content from the plurality of displayed contents, and a control unit configured to control the display unit to discriminately display the selected content and similar contents having a similar type as the selected content from other displayed contents that do not have the similar type as the selected content.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 3 is a diagram of a mapping table for mapping a display font color to a content type according to an embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
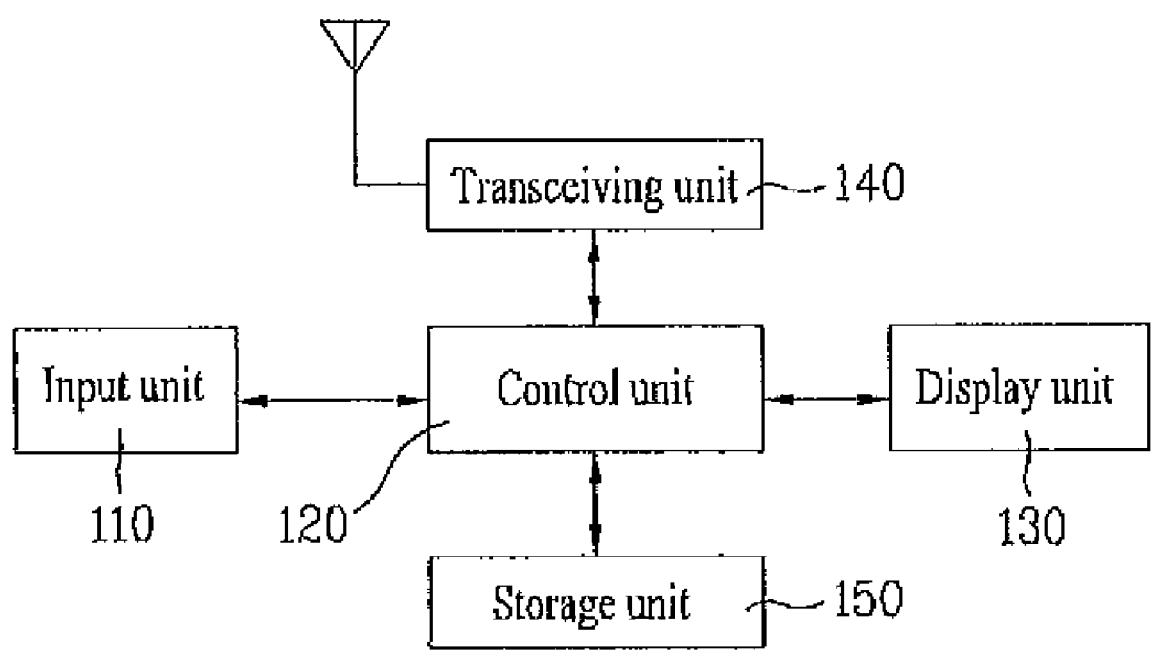
FIG. 1 is a bock diagram of a mobile terminal according to an embodiment of the present invention.

FIG. 1 is a bock diagram of a mobile terminal according to an embodiment of the present invention. As shown, the mobile terminal includes an input unit 110, a control unit 120, a display unit 130, a transceiving unit 140 and a storage unit 150.

The input unit 110 receives an input operation from a user of the terminal 100 and then generates a signal corresponding to the input operation. In particular, the input unit 110 allows the user to select contents displayed on the display unit 130. In more detail, the contents include, for example, a still picture file, a moving picture file, a music file, a sound file, a text file, a flash file (e.g., animation file), etc. The extensions of each file are shown in FIG. 3. Other types of files or contents may also be displayed and defined in the mapping table.

In addition, when the input unit 110 includes a touch-screen, the user can select a specific content from the contents displayed on the touch-screen by touching the specific content. The user can also set a font color, font size, a font type, a font underlining style, a font effect, a background color background color, etc. of the corresponding content.

Further, the control unit 120 controls the overall operation of the terminal. In particular, the control unit 120 controls the display unit 130 to display contents according to embodiments of the present invention. Also, the control unit 120 receives input signals from the input unit 110 such so a user can select displayed contents using a key or button provided with the input unit 110.

Further, the display unit 130 displays various information to the user such as menus used in operating the terminal, various contents, status information about the terminal, etc. The display unit 130 also preferably includes a touch screen that the user may touch to input information.

In particular, the control unit 120 controls the display unit 130 to discriminately display contents that have a similar type (e.g., extension file name) from other contents that do not have the similar type. That is, the control unit 120 controls the display unit 130 to discriminately display contents having a similar type by using at least one of the font color, font size, a font type, a font underlining style, a font effect, and background color of the corresponding content.

For instance, the control unit 120 controls the display unit 130 to discriminately display contents having a similar content using a font color, background color, etc, so the similar types of contents are discriminated from the other types of contents. FIG. 3 illustrates examples of font colors for similar types of contents.

The similar type of contents can also be displayed using a bold font and the other contents with a thin font such that the similar types of contents are discriminated from the other types of contents. Other methods of discriminately displaying the similar type of contents may also be used. For example, the similar type of contents may be arranged or aligned together. The similar contents may also be displayed as having the same background (which is different from the other non-similar contents). The control unit 120 controls the display unit 130 to perform the different displaying methods of the present invention.

In addition, the transceiving unit 140 sends and receives communication signals with an external terminal via a wire/wireless communication network. Further, the storage unit 150 stores data input and output to and from the terminal. In particular, the storage unit 150 stores a plurality of contents in, for example, a sorted manner such that contents having a similar type are stored together.

Figure 2:
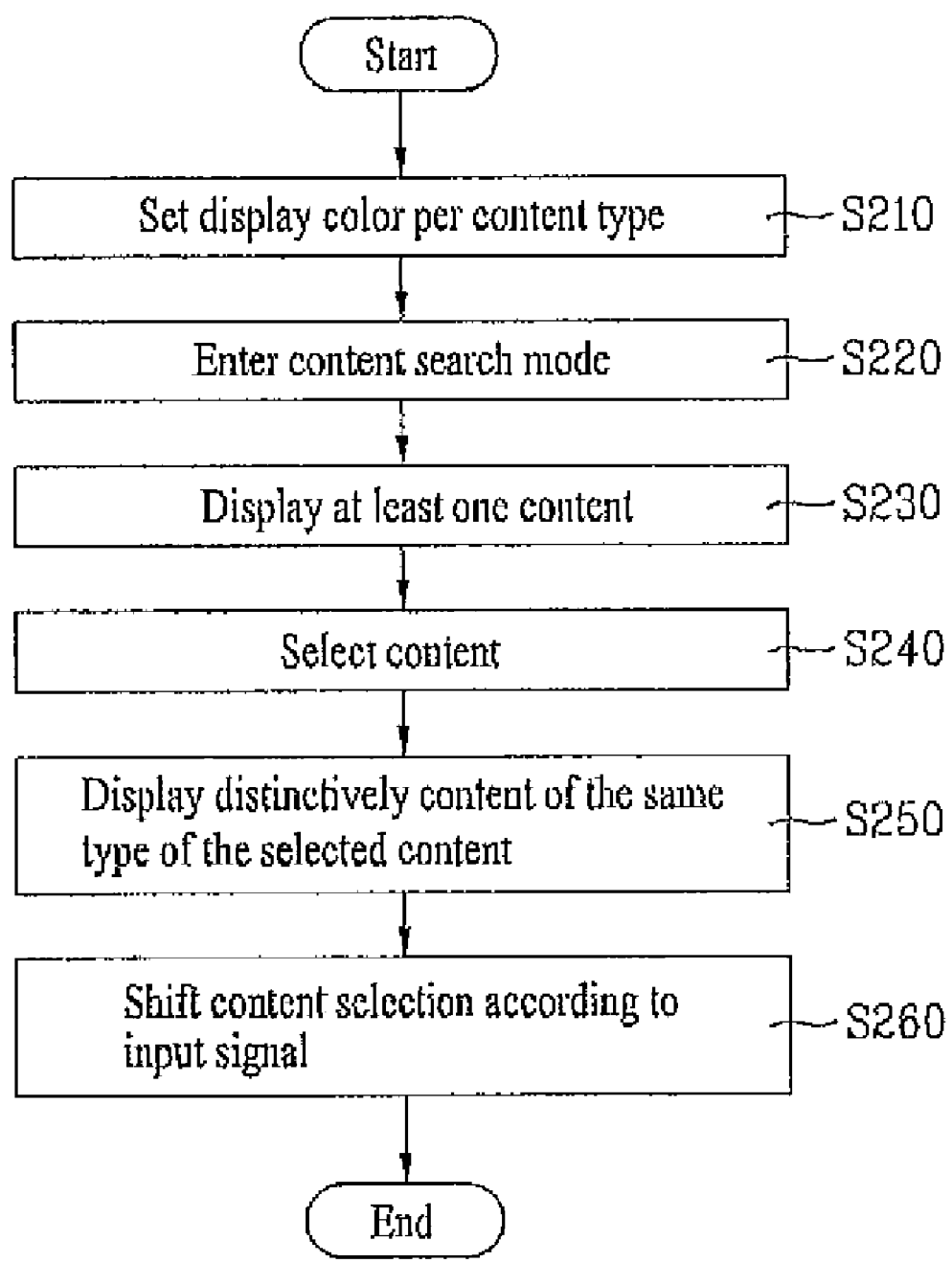
FIG. 2 is a flowchart illustrating a method of distinctively displaying contents according to an embodiment of the present invention.

Next, FIG. 2 is a flowchart illustrating a method of distinctively displaying contents according to an embodiment of the present invention. FIG. 1 will also be referred to in this description.

As shown in FIG. 2, the control unit 120 creates a mapping table including a display color for a content type (S210). Further, the display color can be a font color of the corresponding content or a background color of the corresponding content. For example, the user can define values in the mapping table including a font color, a font type, a font size, a background color, etc. to be used for similar types of contents. These values may be also previously set by a manufacturer of the terminal and then changed later by the user. Alternatively, the control unit 120 can randomly decide the font color, background color, etc. per the content type. FIG. 3 illustrates a mapping table that may be read by the control unit 120 to determine what font color, etc. to use when discriminately displaying similar types of content.

Next, in FIG. 2, the user enters a content search mode by selecting an appropriate key or menu option to instruct the control unit 120 to search the storage unit 150 for contents (S220). Further, when the content search mode is entered, the control unit 120 can display all contents stored in the storage unit 150 or only display specific contents in a directory, for example. That is, the control unit 120 controls the display unit 130 to displays contents based on particular parameters entered by the user (S230).

In addition, the displayed contents may be a list of text files, thumbnail images, etc. that the user can select. The user then selects one the displayed contents (S240), and the control unit 120 controls the display unit 130 to discriminately display contents that have a similar type as the selected content from the other non-similar type contents (S250).

For instance, with reference to the mapping table shown in FIG. 3, when the file extension of the selected content is 'jpg, gif, or sis', the control unit 120 identifies the type of the selected content as a 'Still picture', when the file extension of the selected content is 'skm, k3g, mp4, or avi', the control unit 120 identifies the type of the selected content as a 'Moving picture', and when the file extension of the selected content is 'mp3, dcf, kmp, kcp, kpp, or ned', the control unit 120 identifies the type of the selected content as 'music'.

Similarly, when the file extension of the selected content is 'mmf or gcp', the control unit 120 identifies the type of the selected content as 'sound', when the file extension of the selected content is 'hwp, doc, ppt, xls, pdf, or txt', the control unit 120 identifies the type of the selected content as 'text', and when the file extension of the selected content is 'swf', the control unit 120 identifies the type of the selected content as 'flash'(animation). Therefore, the control unit 120 can identify contents that have a similar type as well as the contents that do not have the similar type.

Further, as shown in FIG. 2, the control unit 120 also moves a cursor to one of the similar contents based on an input signal from the user (S260). That is, the control unit 120 shift or jumps the cursor to similar types of content based on a user's input.

Further, as discussed above, when the input unit 110 includes a touch-screen, the user can simply touch a particular content to perform the selecting step S240. When the input unit 110 includes a key for selecting one of the displayed contents, the user can manipulate or press the key to perform the selecting step S240. That is, the user may manipulate a button, wheel, or jog-dial on a side of the terminal, for example, to select the content.

The process of distinctly displaying contents having a similar type from the other non-similar types of contents will now be described with respect to FIGS. 4-6. The display unit 130 in this description is assumed to have a touch-screen. FIG. 1 will also be referred to in this description.

In more detail, FIGS. 4A-4D are overviews illustrating examples of screen shots on a mobile terminal distinctively displaying contents according to a first embodiment of the present invention. As shown in FIGS, 4A-4D, the terminal includes keys 412 and 414 (up and down keys) at its lateral side to traverse through contents having a similar type as a selected content, and a scroll key 416 on the touch-screen to scroll the displayed contents.

In particular, the user can press the up key 412 to select a similar content that is above the selected content and select the down key 414 to select a content that is below the selected content. Further, as discussed with respect to FIG. 3, the contents having a similar type are discriminated from the other contents using a display color such as a font color, background color, etc. of the similar type contents.

Figure 4A:
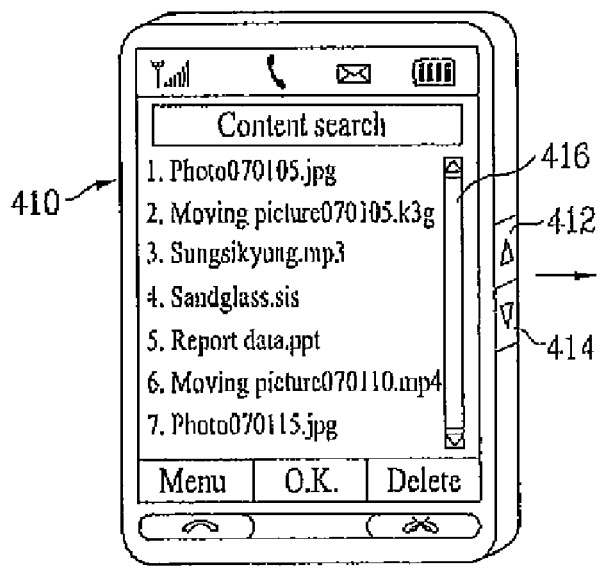
FIGS. 4A-4D are overviews illustrating examples of screen shots on a mobile terminal distinctively displaying contents according to a first embodiment of the present invention.

As shown in FIG. 4A, the user first enters the content search mode by selecting an appropriate menu option or key provided on the terminal 100. Then, the control unit 120 searches the storage unit 150 and displays a screen 410 including a list of contents.

Further, contents that have a similar type are distinguished from the other contents. For example, the contents in FIG. 4A that have the extensions "jpg", "gif" and "sis" are displayed with a red color, contents that have the extensions "skm", "k3g", "mp4" and "avi" are displayed with an orange color, etc. Thus, the user can look at the screen 410 and quickly see what contents have a similar type.

Figure 4B:
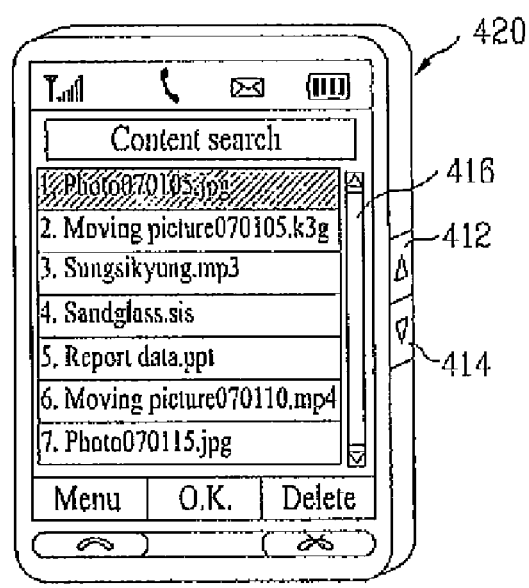
Figure 4C:
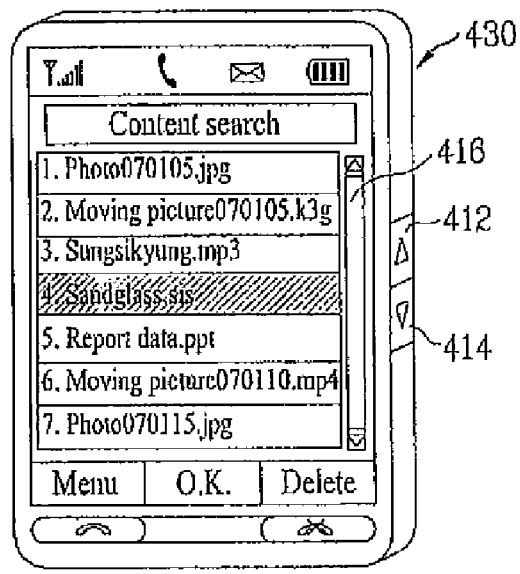
Figure 4D:
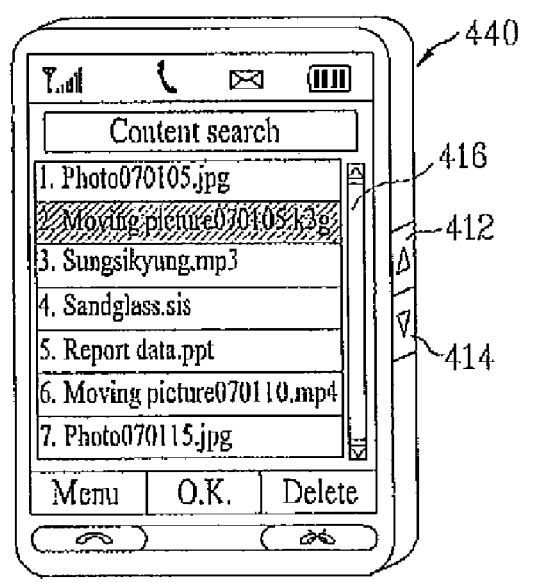

Further, as shown in the screen 420 in FIG. 4B, the user selects the 'photo 070105.jpg' content using the scroll key 416 (note the selected file is highlighted). The user can then jump or move to the next similar type of content such as the 'photo 070105.jpg' file by selecting the down key 414 (see the screen 430 in FIG. 4C in which the "sandglass.sis" file is next highlighted).

The user can also select the up key 412 to jump or move up to a contents file that has the similar type. Further, as shown in the screen 440 in FIG. 4D, the user can use the scroll key 416 to select another file that has a different type. Similar to the description above, when the user selects the other file (i.e., the 'moving picture 070105.k3g'), the user can then traverse through or jump to all other files that have a similar type as the 'moving picture 070105.k3g' file using the up and down keys 412 and 414. Note that the colors of the contents shown in FIG. 4A-4D are based on the colors defined in the mapping table of FIG. 3.

Thus, the user can jump to different files that have the same type using a single key stroke and skip over files that do not have a similar type, whereas previously the user had to use several key strokes to traverse through a plurality of displayed contents. Further, a selected content may be highlighted by blinking or flashing the selected content, etc.

Next, FIGS. 5A-5D are overviews illustrating examples of screen shots on a mobile terminal distinctively displaying contents according to a second embodiment of the present invention. In this embodiment, a selected content and contents having a similar type are discriminated from the other contents by adjusting a font style used in displaying the contents having the similar type. FIG. 1 will also be referred to in this description.

Further, the user may traverse through and select the contents using the keys 512, 514 and 516, which operate in a similar manner as the keys 412, 414 and 416 shown in FIG. 4. Therefore, a detailed description of the keys 512, 514 and 516 will be omitted.

Figure 5A:
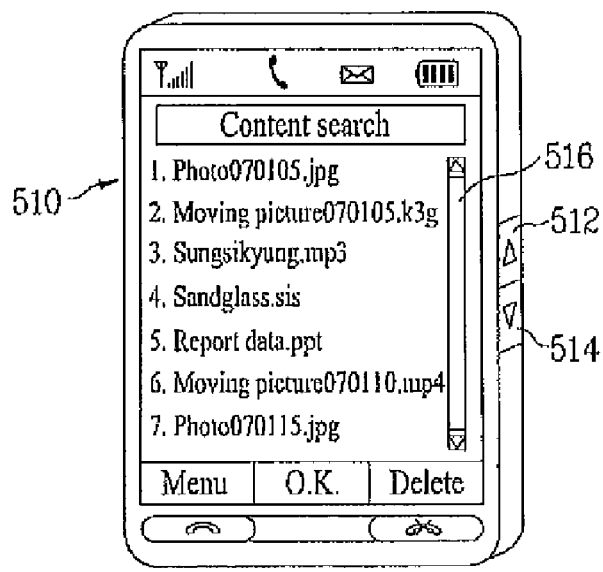
FIGS. 5A-5D are overviews illustrating examples of screen shots on a mobile terminal distinctively displaying contents according to a second embodiment of the present invention.

As shown in FIG. 5A, the control unit 120 displays a screen 510 including a list of contents when the user enters the contents search mode. As shown in the screen 520 in FIG. 5B, when the user selects the 'photo 070105.jpg' file, the 'sandglass.sis' file and the 'photo 070115.jpg' file that have the same type as the 'photo 070105.jpg' file are displayed in a bold font style. Further, because the user selected the 'photo 070105.jpg' file, the 'photo 070105.jpg' file is highlighted to distinguish it from the other files.

Also note that the contents that do not have a similar type as the 'photo 070105.jpg' file (i.e., the 'moving picture 070105.k3g' file, the 'sungsikyung.mp3' file, the 'report-data.ppt' file, and the 'moving picture 070110.mp4' file) are displayed using a different type of font such as a thin font style as shown in the screen 520.

Figure 5B:
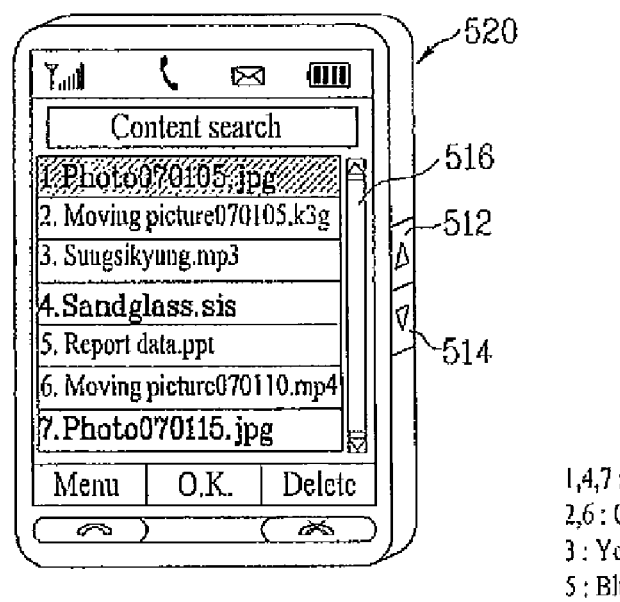
Figure 5C:
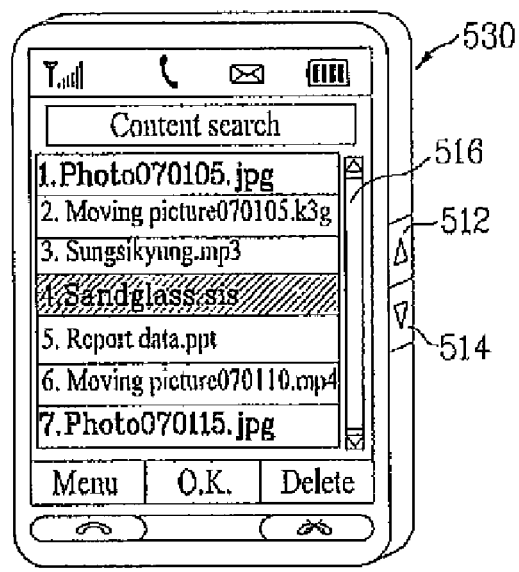

Further, as shown in the screen 530 in FIG. 5C, when the user selects the down key 514 once in the screen 520 shown in FIG. 5B, the 'sandglass.sis' file having a similar type located at a first position in a lower direction among contents of the same type is selected.

Similarly, when the user selects the down key twice, the 'photo 070115.jpg' located at a second position in the lower direction among contents of the same type of the 'photo 070105.jpg' can be selected. Further, when the user selects the up key 512 once while the 'photo 070115.jpg' is selected, the 'sandglass.sis' located at a first position in an upper direction among the contents of the same type of the 'photo 070115.jpg' can be selected.

Figure 5D:
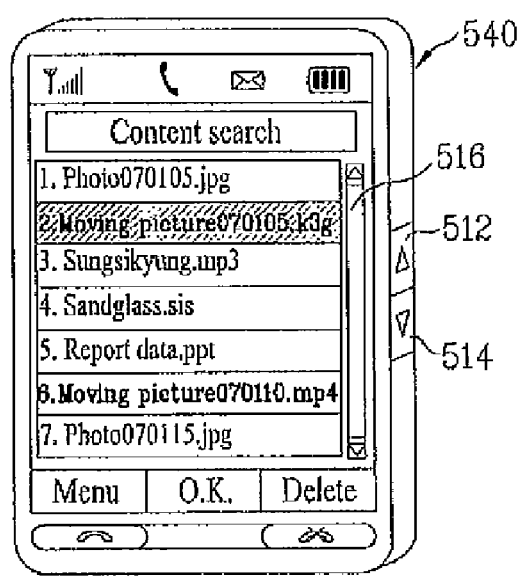

In addition, as shown in the screen 540 in FIG. 5D, the user can select the scroll key 516 to select another content having a different type. Then, the previous selected content is displayed in the normal or thin font, and all contents that have a similar type as the newly selected content are displayed with a bold font (as shown in FIG. 5D).

Next, FIGS. 6A-6E are overviews illustrating examples of screen shots on a mobile terminal distinctively displaying contents according to a third embodiment of the present invention. In more detail, FIGS. 6A-6E show a process for distinctively displaying the selected content and other contents having a similar type by aligning the similar contents together. FIG. 1 will also be referred to in this description.

Further, the keys 612, 614 and 616 shown in FIGS. 6A-6E operate in a similar manner as the keys 412, 414 and 416 shown in FIG. 4, and therefore a detailed description of these keys is omitted.

Figure 6A:
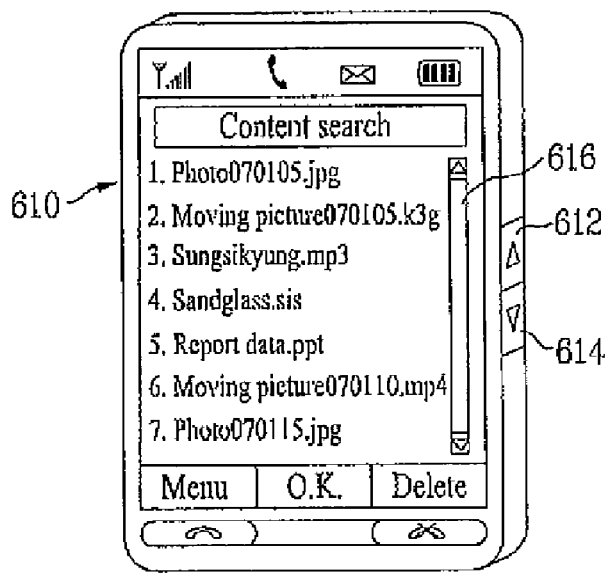
FIGS. 6A-6E are overviews illustrating examples of screen shots on a mobile terminal distinctively displaying contents according to a third embodiment of the present invention.
Figure 6B:
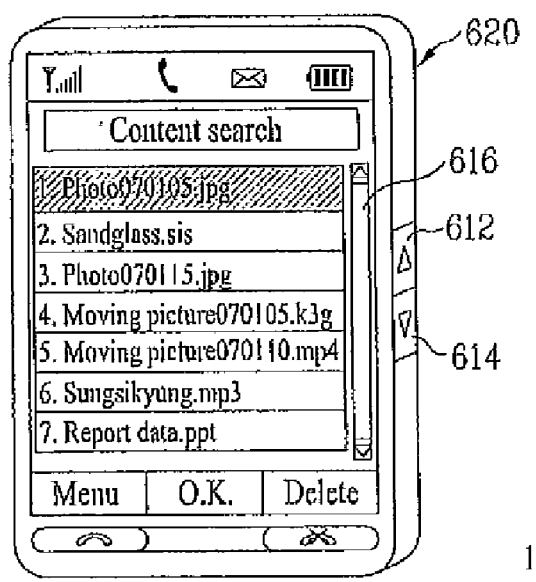
Figure 6C:
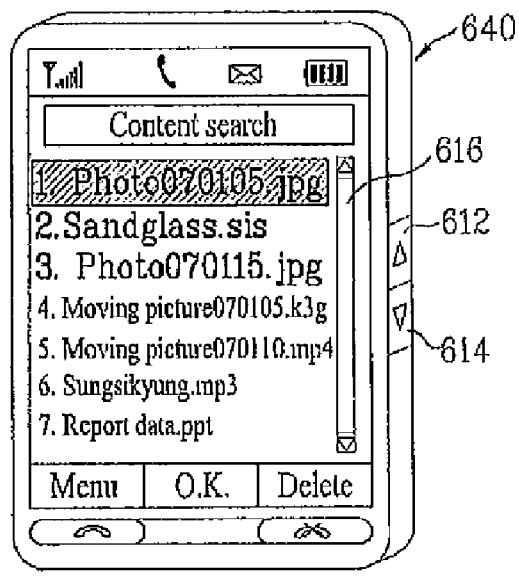
Figure 6D:
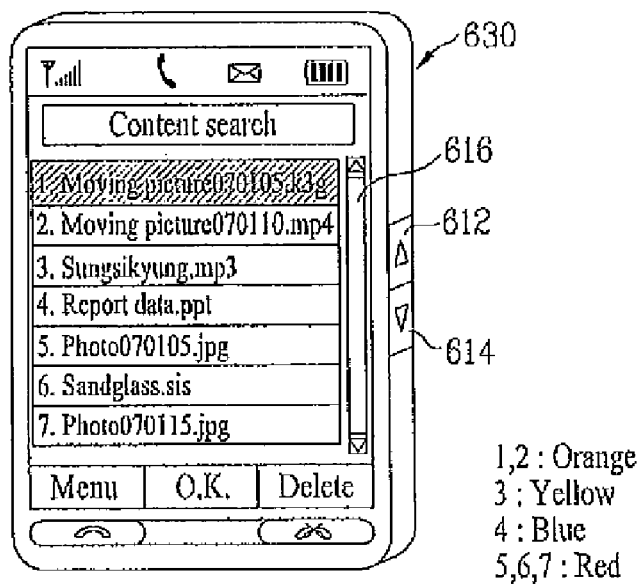
Figure 6E:
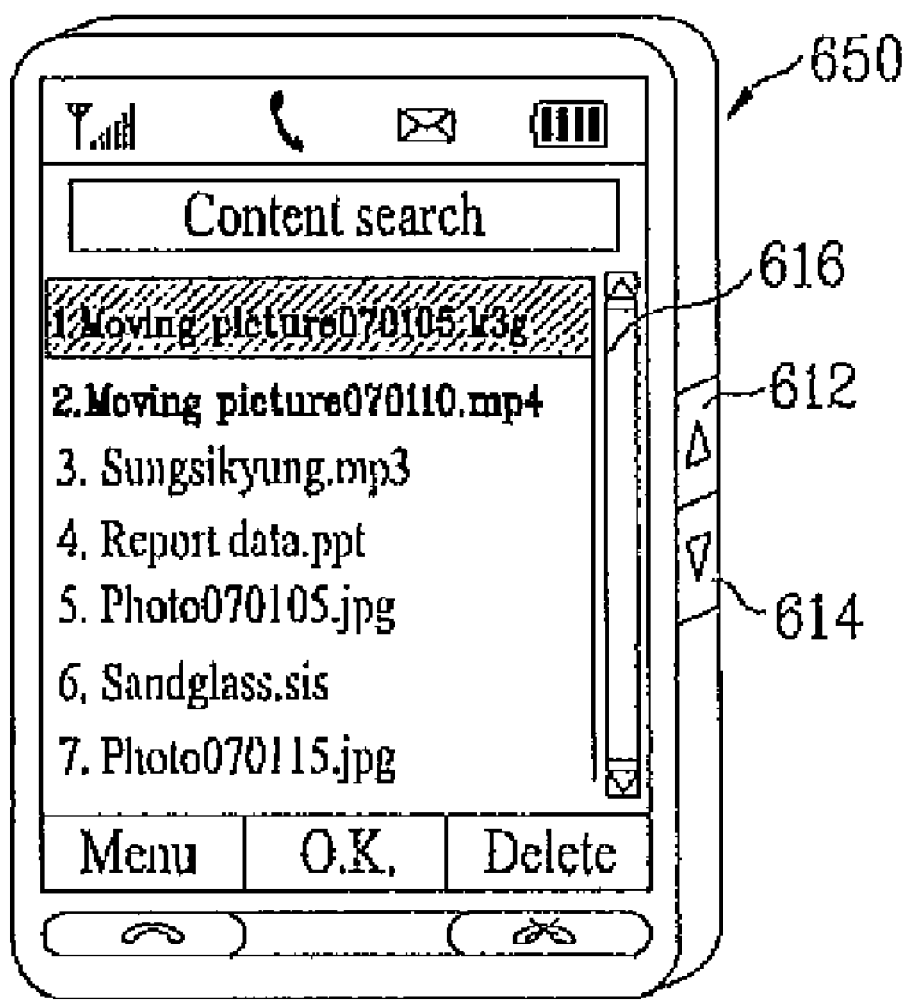

As shown in the screen 610 in FIG. 6A, the control unit 120 displays a list of contents when the user enters a content search mode. Then, as shown in FIG. 6B, the user selects the 'photo 070105.jpg' using the scroll key 616. Then, as shown in the screen 640 in FIG. SC, the contents having a similar type (i.e., the 'sandglass.sis' file and the 'photo 070105.jpg' file) are aligned together. Further, note that the other contents that have a similar type are also arranged or aligned with each other.

Further, the 'sandglass.sis' file, the 'photo 07115.jpg' file, and the 'photo 070105.jpg' file can be displayed in a same color (e.g., red based on the table shown in FIG. 3) or in a bold font style. Also, if the user then selects the 'moving picture 070105.k3g' file that has a different type from the 'photo 070105.jpg' using the scroll key 616, the contents of the same type of the 'moving picture 070105.k3g' file are aligned together as shown in the screen 630 in FIG. 6D. FIG. GE illustrates a similar concept.

Further, rather than using the up and down keys shown in FIGS. 4-6, it is also possible to use soft keys on the touch screen that the user can touch to toggle or traverse between the selected contents and similar contents.

In addition, the above-described embodiments relate to a mobile terminal. That is, the mobile terminal is capable of exchanging signals with an external terminal or a server via a wire/wireless network, such as a mobile phone, a smart phone, a PDA, a notebook computer and the like.

Thus, the present invention has several advantages. First, the present invention displays a plurality of contents that are identified by the type of contents, thereby helping a user to search and select contents. Secondly, the present invention facilitates a shift between contents belonging to the same type using a specific key. Thirdly, the present invention distinctively displays contents of the same type of a current selected content, thereby helping a user to view similar contents and to traverse through a plurality of listed contents.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of displaying contents on a mobile terminal, the method comprising:
   displaying a plurality of contents on a display of the mobile terminal;
   receiving a selection signal indicating a selection of first content from the plurality of displayed contents;
   automatically discriminately displaying the selected first content and second contents that are similar contents having a similar type as the selected first content from other displayed contents that do not have the similar type as the selected first content; and
   traversing from the first content to the second contents while skipping non-selected and non-similar content located between the first and second contents based on an input traversing signal,
   wherein the similar type of contents have a similar extension file name and are executed using a same program.

2. The method of claim 1, wherein the displaying step discriminately displays the selected first content and the second contents from the other displayed contents using a font color.

3. The method of claim 1, wherein the discriminately displaying step discriminately displays the selected first content and the second contents from the other displayed contents using a font style.

4. The method of claim 1, wherein the discriminately displaying step discriminately displays the selected first content and the second contents from the other displayed contents by aligning the selected first content and the second contents together.

5. The method of claim 1, wherein the discriminately displaying step discriminately displays the selected first content and the second contents from the other displayed contents using at least one of a font color, a font size, a font type, a font underlining style, a font effect, and a background color of the discriminated selected first content and the second contents.

6. The method of claim 1, wherein the selected first content and second contents are displayed in a non-sequential order such that the traversing step skips over the other contents that do not have the similar type when traversing between the selected first content and the second contents.

7. The method of claim 1, wherein the input traversing signal is generated by a user touching a scroll region on a touch-screen on the mobile terminal or by manipulating a key button on the mobile terminal.

8. The method of claim 1, further comprising:
   creating a mapping table including a listing of types of contents, file extensions for the types of contents, and a font characteristic to be used when displayed the selected content and the similar contents,
   wherein the mapping table includes groupings of file extensions that are similar.

9. The method of claim 8, wherein the types of contents include a still picture file, a moving picture file, a music file, a sound file, a document file, and an animation file.

10. A mobile terminal, comprising:
    a display unit configured to display a plurality of contents;
    an input unit configured to select a first content from the plurality of displayed contents; and
    a control unit configured to control the display unit to automatically discriminately display the selected first content and second contents that are similar contents having a similar type as the selected content from other displayed contents that do not have the similar type as the selected first content,
    wherein the control unit is further configured to traverse from the first content to the second contents while skipping non-selected and non-similar content located between the first and second contents based on an input traversing signal, and
    wherein the similar type of contents have a similar extension file name and are executed using a same program.

11. The mobile terminal of claim 10, wherein the control unit controls the display unit to discriminately display the selected first content and the second contents from the other displayed contents using a font color.

12. The mobile terminal of claim 10, wherein the control unit controls the display unit to discriminately display the selected first content and the second contents from the other displayed contents using a font style.

13. The mobile terminal of claim 10, wherein the control unit controls the display unit to discriminately display the selected first content and the second contents from the other displayed contents by aligning the selected first content and the second contents together.

14. The mobile terminal of claim 10, wherein the control unit controls the display unit to discriminately display the selected first content and the second contents from the other displayed contents using at least one of a font color, a font size, a font type, a font underlining style, a font effect, and a background color of the discriminated selected first content and the second contents.

15. The method of claim 10, wherein the input unit includes an up and down key to traverse between the selected first content and the second contents.

16. The mobile terminal of claim 15, wherein the selected first content and the second contents are displayed in a non-sequential order such that when either of the up and down keys are selected, a next similar content is selected by skipping over the other contents that do not have the similar type when traversing between the selected first content and the second contents.

17. The mobile terminal of claim 15, wherein the up and down key comprises a side key on the terminal or a soft key on a touch screen of the display unit.

18. The mobile terminal of claim 10, wherein the control unit creates a mapping table including a listing of types of contents, file extensions for the types of contents, and a font characteristic to be used when displayed the selected content and the similar contents, and
    wherein the mapping table includes groupings of file extensions that are similar.

19. The mobile terminal of claim 18, wherein the types of contents include a still picture file, a moving picture file, a music file, a sound file, a document file, and an animation file.

* * * * *